Aug. 12, 1969

J. M. COLBY ET AL 3,460,802

VALVE ASSEMBLY

Filed Dec. 13, 1966

INVENTOR
JOSEPH M. COLBY
PAUL A. MANOR
GUSTAV KANIA

BY Strauch Nolan Neale Nies + Kurz

ATTORNEYS

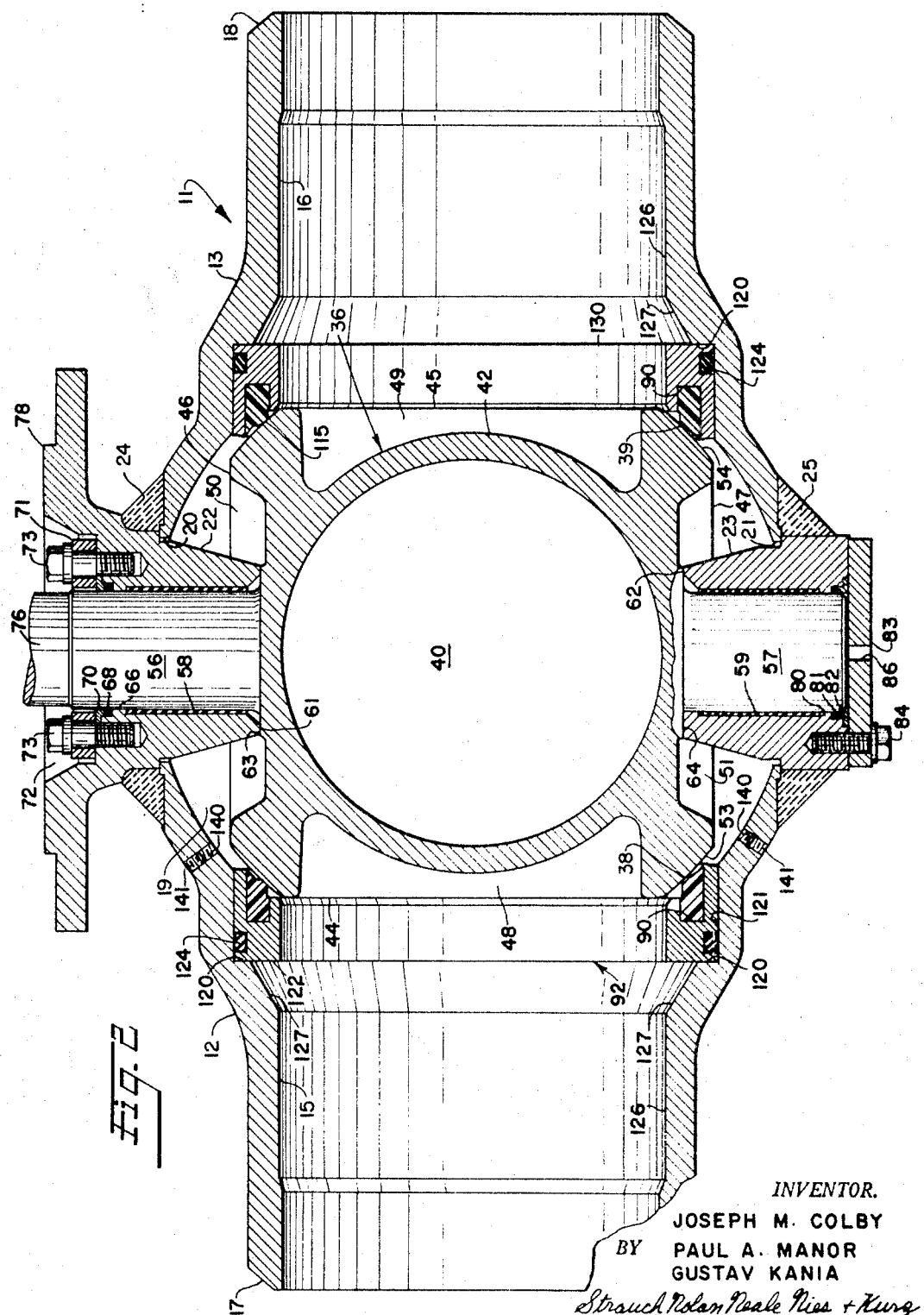

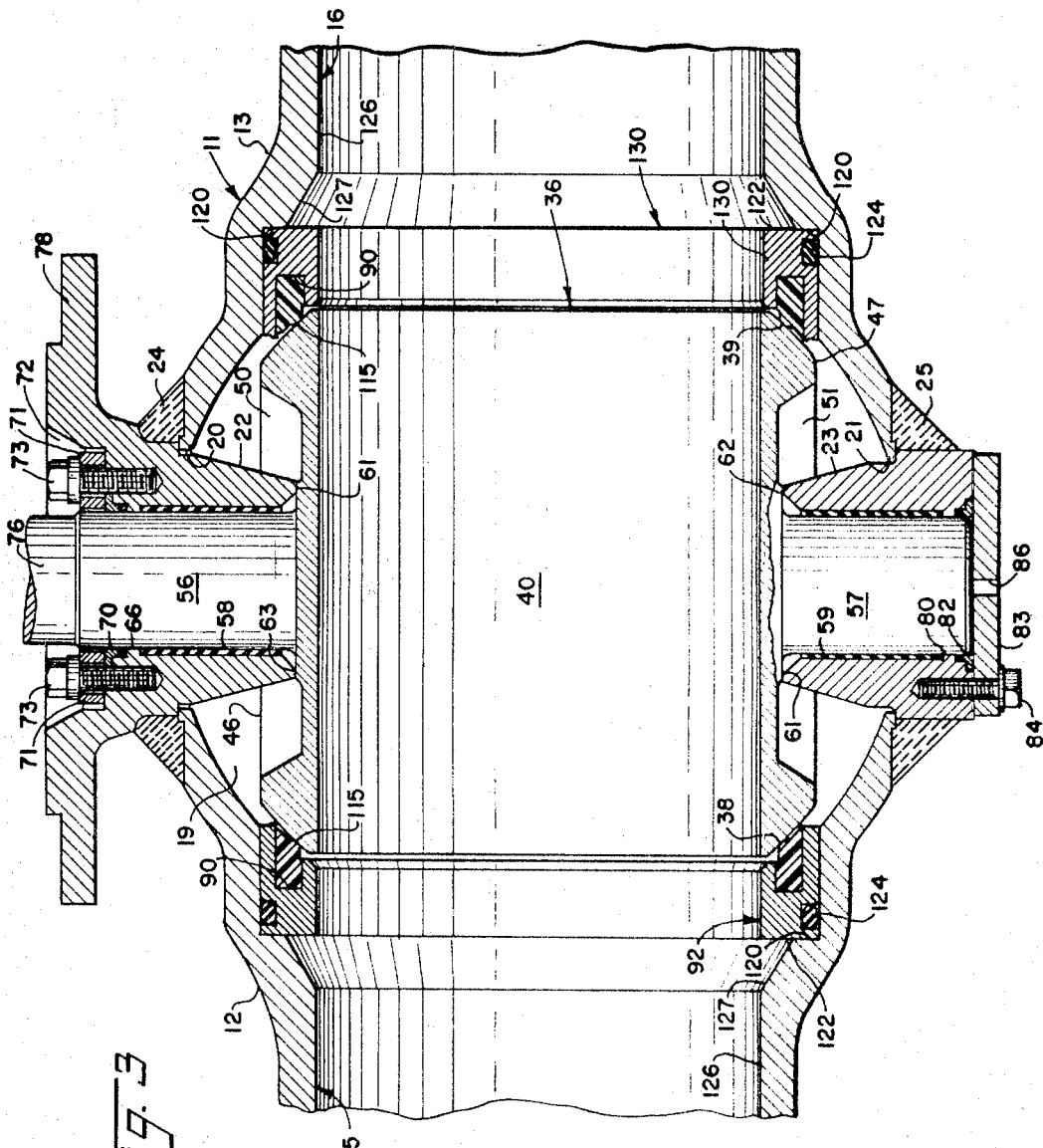

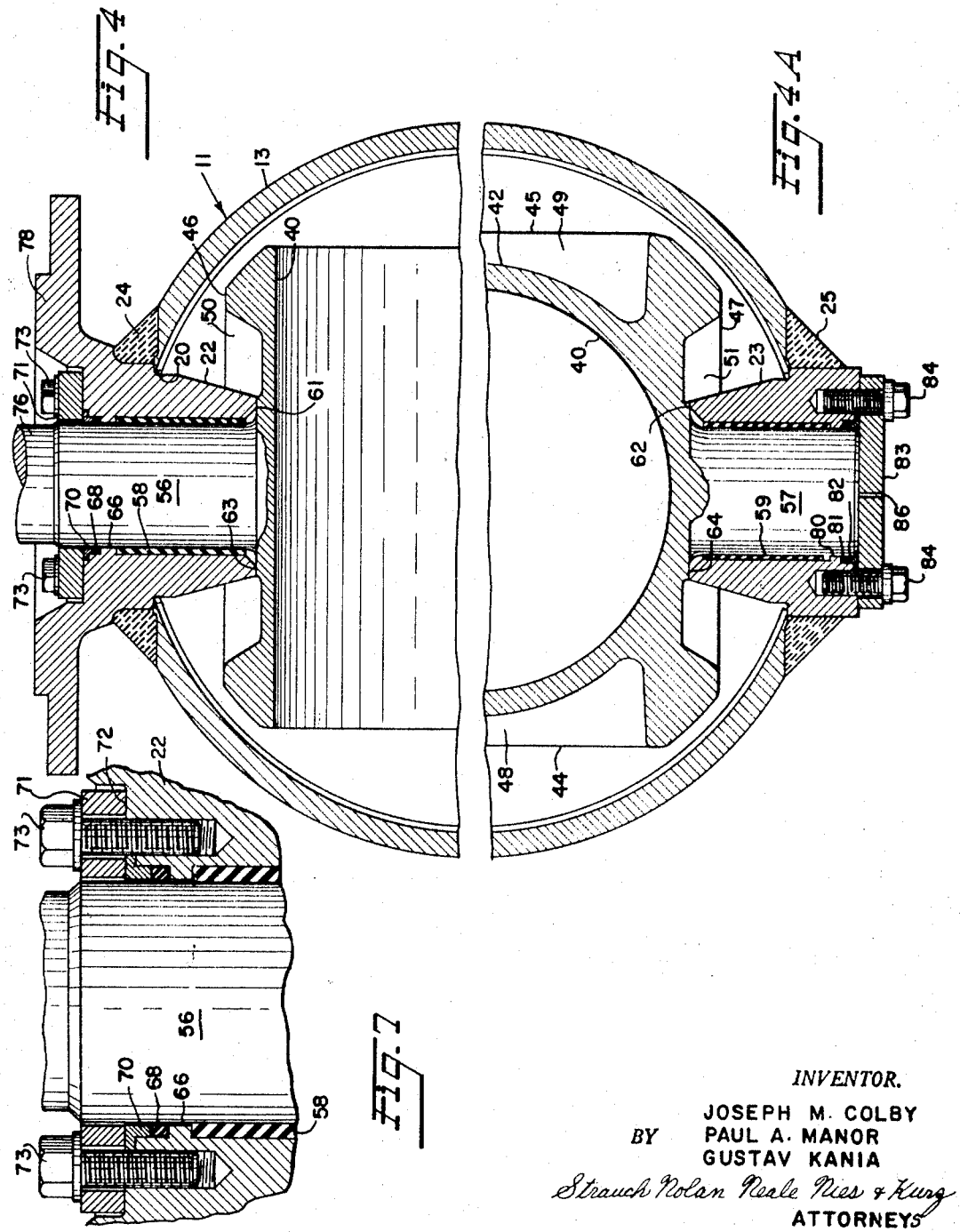

United States Patent Office 3,460,802
Patented Aug. 12, 1969

3,460,802
VALVE ASSEMBLY
Joseph M. Colby, Paul A. Manor, and Gustav Kania, Pittsburgh, Pa., assignors to Rockwell Manufacturing Company, Pittsburgh, Pa., a corporation of Pennsylvania
Filed Dec. 13, 1966, Ser. No. 601,412
Int. Cl. F16k 5/06, 27/06
U.S. Cl. 251—172                                          17 Claims

ABSTRACT OF THE DISCLOSURE

A ball type valve plug assembly having a body defined by separately formed, axially aligned sections which are joined at their inner ends by an endless weld joint and which respectively defined upstream and downstream passages opening at their inner ends into a valve plug cavity. An axially floating seat ring assembly which is mounted at the inner end of each passage has a plug-sealing, elastically deformable annulus anchored to a rigid seat ring. Each seat ring assembly is axially slidable between a ported valve plug in the valve body cavity and an opposing internal wall surface of the valve body. The valve body sections are sufficiently drawn together by shrinkage of the weld joint to engage the internal wall surface with the seat ring assembly and to axially urge it to a position where the sealing annulus deforms against the valve plug, thereby providing a preloaded seating pressure between the plug and seat ring assembly during valve operation. The valve plug is formed with a plurality of annular ribs integrally extending from a ported, central, cylindrical portion and defining a series of outwardly opening cavities, space around the central, cylindrical portion. The end faces of the ribs are contained in a common spherical envelope and are engageable by the seat ring sealing annulus as the plug is rotated between its opened and closed positions.

---

The present invention relates to plug valves and more particularly to ball type plug valves and to methods of their manufacture.

This invention is especially concerned with plug valves of the type wherein a ported plug is rotatable on cooperating seat ring surfaces through which line fluid is adapted to pass within a valve body. Valves of this type are sometimes called ball valves. One of the main problems with these valves involves fluid tight sealing at the plug seats under all operational conditions.

The present invention contemplates and has as its major object a novel plug valve assembly for improving the sealing effect at the plug seats.

Another object of this invention is to provide a novel means for preloading elastically deformable, valve plug seats.

Still another object of this invention is to provide an improved seat ring structure having a novel association with the ported valve plug.

A further object of this invention is to provide a novel method of manufacturing a plug valve for preloading elastically deformable plug seats.

Another object of this invention is to provide a novel valve plug seat which is made of relatively hard elastomer.

A further object of this invention is to provide a novel plug valve body assembly which facilitates the preloading of elastically deformable plug seats.

Still another object of this invention is to provide a novel, lightweight, ball type valve plug having a configuration which minimizes the amount of material needed for its construction.

Another object of this invention is to provide a novel seal and bearing construction for the valve plug trunnions. As compared with conventional structures, the trunnion seal and bearing assembly of this invention has fewer parts to thus reduce the costs of manufacture.

Further objects of this invention will appear as the description proceeds in connection with the appended claims and annexed drawings wherein:

FIGURE 2 is a longitudinal section taken substantially along lines 2—2 of FIGURE 1 and showing the assembly in valve closed condition;

FIGURE 3 is a longitudinal section like FIGURE 2, but showing the assembly in valve opened condition;

FIGURE 4 is a transverse section taken substantially along lines 4—4 of FIGURE 1 and showing the ball plug in valve closed position;

FIGURE 4A is a view similar to FIGURE 4, but showing the ball plug in valve opened position;

FIGURE 7 is an enlarged fragmentary view of the preferred plug trunnion bearing and seal construction shown in FIGURES 2 and 3.

Figure 1:
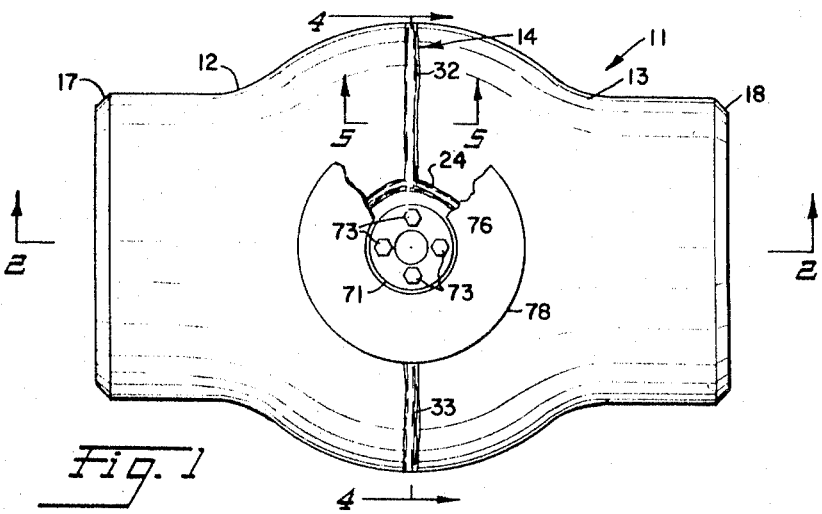
FIGURE 1 is a plan view showing a ball type plug valve assembly constructed according to the preferred embodiment of this invention.

As shown in FIGURES 1–3 the body 11 of this invention consists essentially of two symmetrical, identically constructed, axially aligned, hollow members 12 and 13 permanently secured together by a weld joint indicated at 14 in FIGURE 1. Body members 12 and 13 are respectively formed with tubular end portions which define axially aligned fluid flow passages 15 and 16 therethrough. The outer ends of members 12 and 13 are bevelled at 17 and 18 for welding to a pipeline or the like. The valve, as shown in this embodiment, is a two-way valve, and for purposes of this disclosure, passage 15 may be considered to be on the inlet or upstream side and passage 16 may be considered to be on the outlet or downstream side.

Still referring to FIGURES 2 and 3, the inner ends of body members 12 and 13 are enlarged and are of generally segmentally spherically contour to define a central essentially spherically shaped plug receiving cavity 19. At the top and bottom of body 11, the opposed edges of members 12 and 13 are formed with semi-circular notches which define top and bottom circular apertures 20 and 21. Apertures 20 and 21 are formed along a common axis which extends medially of cavity 19 and which normally interesects the common longitudinal axis of passages 15 and 16.

An upper trunnion-receiving boss 22 coaxially extends through aperture 20, and a lower trunnion-receiving boss 23 coaxially extends through aperture 21. An annular weld 24 peripherally and coaxially surrounding aperture 20 and boss 22 rigidly joins boss 22 to body members 12 and 13. Similarly, an annular weld 25 peripherally and coaxially surrounding aperture 21 and boss 23 rigidly joins boss 23 to members 12 and 13. Welds 24 and 25 are axially aligned.

Figure 5:
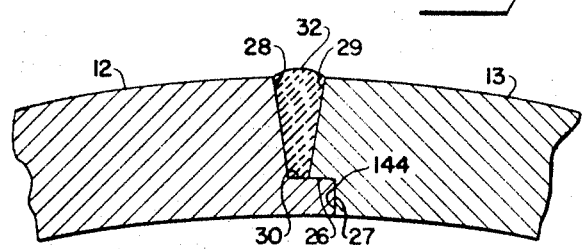
FIGURE 5 is an enlarged fragmentary section taken substantially along lines 5—5 of FIGURE 1.

Referring to FIGURE 5, the edge of body member 13 opposing body member 12 is undercut to form a recess 26 which receives a complementary, axially extending lip 27. Lip 27 is formed on body member 12 at the inner edge thereof and is annular except for the interruptions made by the semi-circular notches defining apertures 20 and 21. The opposed ends of body members 12 and 13 are respectively formed with surfaces 28 and 29 which diverge outwardly to define two arcuate, outwardly opening grooves 30 (one shown in FIGURE 5) of essentially V- shaped cross section. Grooves 30 are disposed on opposite sides of the valve body and circumferentially extend between welds 24 and 25.

As best shown in FIGURE 1, girth welds 32 and 33 are built up in grooves 30 to define joint 14 and rigidly join members 12 and 13 together. Welds 32 and 33 extend continuously between and are joined at opposite ends to welds 24 and 25 on their respective sides of the valve body. Welds 32 and 33 are contained in a common plane normally intersecting the common axis of passages 15 and 16. A circular envelope containing welds 32 and 33 is coaxial with the longitudinal axis of the valve body.

Lip 27, as shown in FIGURE 5, extends axially beyond surface 29 so that a portion thereof at its juncture with surface 28 defines the bottom of each groove 30. This construction advantageously provides a pilot for assembling body members 12 and 13 and prevents weld metal from objectionably seeping into cavity 19 to form icicle-like formations during the welding operation.

Referring back to FIGURES 2–4, a metallic, one-piece, ball type valve plug 36, which is rotatably mounted in cavity 19 on a pair of seat ring inserts 38 and 39, is formed with an open-ended port or diametrical passage 40. Port 40 is adapted to align with the inner ends of passages 15 and 16 when plug 36 is in the full open position shown in FIGURE 3. Plug 36 is rotatable 90° about its vertical axis to a closed position (see FIGURE 2) where port 40 extends at right angles to the common longitudinal axis of passages 15 and 16 to thus block fluid communication between the valve body, fluid flow passages.

With continuing reference to FIGURES 2–4, plug 36 is formed with a central, cylindrical body section 42 defining port 40. A plurality of annular ribs 44, 45, 46, and 47 formed integral with and extending outwardly from body section 42 define four outwardly opening, generally cup-shaped cavities 48, 49, 50, and 51 which are spaced equiangularly about the cylindrical circumference of section 42. Rib 44 tangentially merges at diametrically opposed regions with ribs 46 and 47. Rib 45 also tangentially merges at diametrically opposed regions with ribs 46 and 47. The junctures of each of the ribs 46 and 47 with ribs 44 and 45 are also diametrically opposed. With this rib construction, cavities 48 and 49, which open axially in opposite directions and towards the inner ends of passages 15 and 16 when plug 36 is in its valve closed position, are axially aligned along a common horizontal axis normally intersecting the longitudinal axis of port 40 medially between the opposite, open ends thereof. Cavities 50 and 51 axially align along a common vertical axis which normally intersects the common longitudinal axis of cavities 48 and 49. As shown, cavities 50 and 51 are coaxial with the rotation axis of plug 36.

As best shown in FIGURE 2, the outer ends of ribs 44–47 are contained in a common spherical envelope to define seating surfaces 53 and 54 which are adapted to engage seats 38 and 39 to provide annular fluid tight seals around the inner ends of passages 15 and 16 respectively. This unique rib construction reduces the spherical plug surface to essentially only those areas which are engaged by seats 38 and 39 as plug 36 is rotated between its valve opened and valve closed positions. As a result, the weight of the plug is greatly reduced and a significant savings in material needed to form the plug is realized.

A pair of axially aligned, trunnions 56 and 57 are shown in FIGURES 2–4 to extend in opposite directions from diametrically opposed regions of the plug body section 42. Trunnions 56 and 57 may either be integral with plug 36 or otherwise rigidly joined to the plug body section. The common axis of trunions 56 and 57 normally intersects the longitudinal axis of port 40 medially between the open port ends.

Trunnions 56 and 57 respectively extend coaxially into bosses 22 and 23 and are journalled therein by sleeve bearings 58 and 59. Plug 36 is thus rotatable about the common axis of trunnions 56 and 57 which coact with bosses 22 and 23 to prevent the plug from being bodily shifted in a vertical plane. Bearings 58 and 59 are press fitted into the bores of bosses 22 and 23 and may be made from sintered metal with a permanent lubricating ingredient.

The inner ends of bosses 22 and 23 are respectively finished with parallel, planar, annular surfaces 61 and 62. Surfaces 61 and 62 matingly seat against smooth, flat surfaced, annular shoulders 63 and 64 formed integral on plug 36 to prevent displacement of the plug along the common trunnion axis. Shoulders 63 and 64 are peripherally surrounded by ribs 46 and 47 respectively. The interface between each of the surfaces 61 and 62 and its associated plug shoulder extends at right angles to the plug rotational axis.

As best shown in FIGURE 7, boss 22 is formed with a radially inwardly extending land 66 having axially oppositely facing, annular shoulders which are contained in parallel planes extending normal to the longitudinal axis of the boss. Land 66 is disposed intermediate the opposite ends of the trunnion-receiving bore extending through boss 22. The upper end of bearing 58 is adapted to seat against the downwardly facing shoulder on land 66.

A resilient O-ring 68 peripherally surrounding trunnion 56 is confined between the upwardly facing shoulder of land 66 and a spacer ring 70. Ring 70 slidably receives trunnion 56 and is confined against axial displacement by bearing against a retainer plate 71 which is seated in an annular recess 72 at the upper end of boss 22. Plate 71 is detachably secured to boss 22 by machine screws 73. By tightening screws 73, O-ring 68 is compressed between the axially opposed spacer ring and land surfaces to engage trunnion 56 for providing an annular fluid tight seal which prevents fluid leakage along the cylindrical trunnion surface.

The upper end of trunnion 56 extends with a slight clearance through an aperture in plate 71 and terminates, preferably integrally, in a valve operating stem 76. The upper end of boss 22 is advantageously provided with a flange 78 for mounting an unshown valve operator that is adapted to be operatively connected to stem 76.

Boss 23 also is integrally formed with a land 80 extending radially inwardly intermediate the opposite ends of the trunnion receiving bore. As viewed from FIGURES 2–4, bearing 59 is seated against the upwardly facing shoulder on land 80, and an O-ring 81 is axially confined between the downwardly facing shoulder on the land and a spacer ring 82. A cover plate 83 extending over the outer end of the bore in boss 23 is detachably secured to boss 23 by machine screws 84 (one shown in FIGURE 2). Spacer ring 82, which rotatably receives the outer end of trunnion 57 and which is received in the outer end of the trunnion receiving bore formed through boss 23, is held against displacement axially outwardly by bearing engagement with plate 83. By tightening screws 84, O-ring 81 is compressed between the axially opposed land and spacer ring faces to engage and provide a fluid tight seal around the cylindrical periphery of trunnion 57. Land 80, O-ring 81, and spacer ring 82 are essentially identical to and arranged in the same manner as land 66, O-ring 68, and spacer ring 70. This unique boss, bearing, O-ring and spacer ring construction minimizes the number of parts needed for journalling trunnions 56 and 57 and for providing a fluid tight seal around the trunnion peripheries.

With continuing reference to FIGURES 2–4, the end of trunnion 57 is axially spaced from the inner flat face of cover plate 83. This space is vented to atmosphere through an aperture 86 in plate 83 to balance the pressures acting axially of trunnion 57 and of stem 76.

Figure 6:
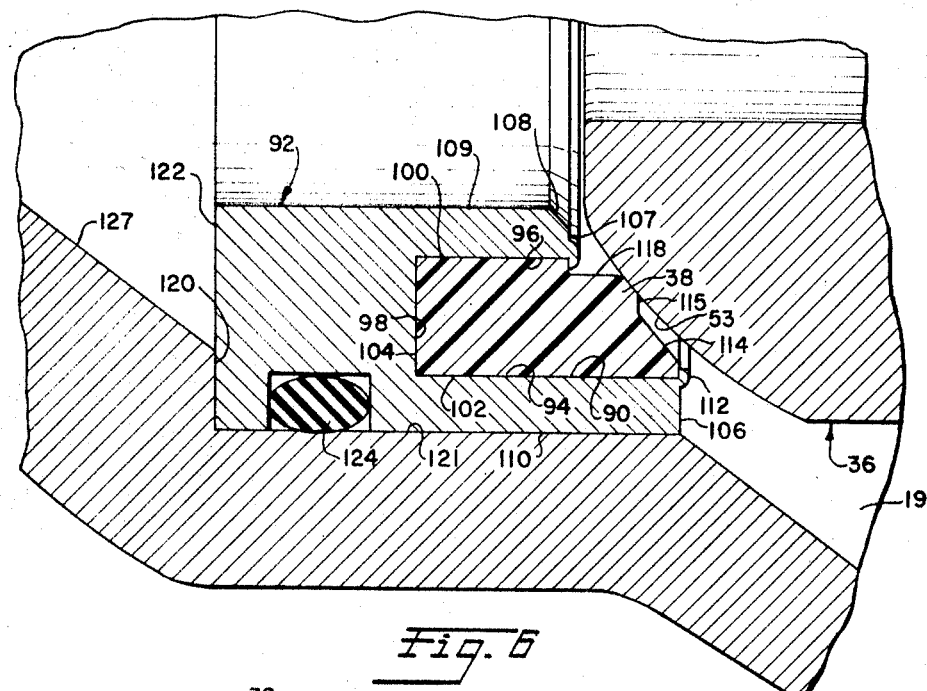
FIGURE 6 is an enlarged, fragmentary view of the preferred seat ring construction shown in FIGURES 2 and 3.

As best shown in FIGURE 6, insert 38 is received in a deep annular recess 90 which is formed in a metal seat ring 92. Recess 90, which opens axially towards plug 36 and which is coaxial with the longitudinal axis of passage 15, is formed with cylindrically rough, opposed, concentric, annular side walls 94 and 96 and a flat bottom wall 98. Wall 98 is contained in a plane which normally intersects the longitudinal axis of seat ring 92.

According to this invention, insert 38 is preferably made of urethane having a durometer hardness of about 70 on the D scale, which is approximately the hardness of the present-day automobile steering wheel. Insert 38 is bonded by a suitable adhesive to walls 94, 96 and 98 and is best shown in FIGURE 6 to be formed with inner and outer concentric, cylindrically rough surfaces 100 and 102 and a flat rearwardly facing surface 104. Surfaces 100, 102 and 104 interfittingly seat against walls 94, 96, and 98 with the result that insert 38 completely fills recess 90.

With continuing reference to FIGURE 6, seat ring 92 is formed with two flat end faces 106 and 107 which extend radially in opposite directions from the inner and outer peripheral edges of recess 90. Faces 106 and 107 are contained in parallel planes which normally intersect the longitudinal axis of ring 92. End face 107 is joined by a bevelled surface 108 to the cylindrically smooth periphery 109 of ring 92. End face 106 extends radially from the outer peripheral edge of recess 90 to the cylindrically smooth outer periphery 110 of ring 92.

At the juncture of end face 106 with wall 94, ring 92 is formed with an annular lip 112 which extends radially inwardly to interfittingly overlap the opposing end on insert 38.

Still referring to FIGURE 6, end face 107 is shown to be spaced axially outwardly from face 106 with respect to cavity 19. Insert 38 thus projects axially beyond end face 107 in a direction extending towards plug 36. The forward end of insert 38 facing plug 36 is formed with a continuous, spherical surface 114 which extends from the insert region engaging lip 112 to an annular lip 115.

Surface 114 is shaped to interfit with the spherical seating surface on plug 36. Lip 115, which is integral with insert 38, projects axially toward plug 36 and provides a juncture between surface 114 and a stepped inner peripheral surface 118 on the insert. Surface 118, which has a uniform diameter slightly greater than that of surface 100, is joined to surface 100 by a radial shoulder closely in the region of end face 107.

As shown in FIGURES 2, 3 and 6, seat ring 92 is slidably and interfittingly seated in a diametrically enlarged recessed portion of body member 12. The recessed portion is defined by a flat surfaced, annular shoulder 120 and by smooth internal cylindrical surface 121. Shoulder 120 faces cavity 19 and extends radially outwardly from the inner end of passage 15. Seat ring 92 has a flat, radial end face 122 which is adapted to interfittingly seat against shoulder 120. Axial displacement of seat ring 92 away from cavity 19 is thus limited by engagement with shoulder 120.

Surface 121 extends axially between shoulder 120 and the internally spherically contoured, inner end portion of member 12 which defines cavity 19. Seat ring 92 is formed with a radially outwardly opening, annular groove in which a resilient O-ring 124 is seated. O-ring 124 peripherally engages surface 121 to provide a fluid-tight seal for preventing fluid leakage between the opposing peripheral surfaces on seat ring 92 and body member 12.

As shown in FIGURES 2 and 3, the portion of passage 15 indicated at 126 and extending from the weld end 17 to a region axially spaced from shoulder 120 has a generally uniform diameter which is appreciably smaller than the inner diameter of shoulder 120. Passage portion 126 is joined to the inner peripheral edge of shoulder 120 by an essentially conically contoured surface 127. Surface 127 diverges towards cavity 19 and provides a smooth transition between passage portion 126 and shoulder 120.

Still referring to FIGURES 2 and 3, the internal diameter of seat ring 92 is appreciably smaller than the diameter of the inner peripheral edge of shoulder 120. As a result, ring 92 projects radially inwardly beyond shoulder 120 so that a significant area of end face 122 facing the outer end of passage 15 is exposed to and contacted by the pipeline fluid during valve operation. Since seat ring 92 is slidable along the internal cylindrical shoulder 121 of member 12, the pressure of line fluid in passage 12, which is applied to end face 122, axially urges seat ring 92 towards plug 36 when plug 38 is in its valve closed position. This displacement is resiliently opposed by engagement of the elastically deformable insert 38 with plug 36. In effect, therefore, seat ring 92 floats axially in the recessed part of body member 12 in a manner that will be explained in greater detail later on.

As shown in FIGURES 2 and 3, insert 39 is also mounted in a recessed, metal seat ring 130. Insert 39, ring 130 and the body member 13 are all of the same construction as insert 38, ring 92, and member 12 with the parts on one side of cavity 19 being in mirror image relation with the parts on the opposite side of the plug-receiving cavity. Accordingly, like reference numerals have been applied to identify like elements.

The axial dimensions between the seating surfaces of plug 36 and shoulders 120 in passages 15 and 16 are made slightly smaller than the assembly of each of the inserts 38 and 39 and its associated seat ring along a plane passing through the insert lip 115. With this structural relation, each lip 115, which engages the plug seating surface, is slightly deformed. As a result, each of the seat ring inserts 38 and 39 is preloaded or pre-squeezed to provide an initial fluid tight seal in absence of sufficient line fluid pressure for urging either or both of the seat rings 92 and 130 towards plug 36.

When plug 36 is turned to its valve-closed position and the upstream and/or downstream fluid pressure is zero or relatively small, only the lips 115 of inserts 38 and 39 engage the plug seating surfaces as best shown in FIGURE 6. Under these conditions, the force axially exerted on the exposed area of the end face 122 of seat ring 92 by upstream line fluid pressure is opposed by the summation of forces resulting from (a) elastic deformation of insert 38 as it is urged against the plug seating surface and (b) the upstream fluid pressure acting axially on end face 107 and the vertical projection of bevelled surface 108. As shown, the exposed area of end face 122 is appreciably greater than the oppositely facing combined back pressure areas of end face 107 and the vertical projection of bevelled surface 108. This difference in area is made sufficiently large that, as the upstream fluid pressure increases, seat ring 92, being on the upstream side in this embodiment, is displaced axially towards plug 36 to further deform insert 38, thereby increasing the insert sealing area along the plug sealing surface 53.

Axial displacement of seat ring 92 towards plug 36 unseats ring 92 from shoulder 120, allowing upstream fluid pressure to enter the space therebetween. As a result, upstream fluid pressure will then act over the entire area of end face 122 to axially urge seat ring 92 towards plug 36. This force exerted by line fluid pressure increases the deformation of insert 38 against plug 36 to provide a tighter seal over a greater area.

As the fluid pressure continues to increase under the foregoing conditions, lip 115 eventually flattens and plug 36 is then engaged by surface 114 as well as the flattened lip 115 on insert 38. A large sealing surface is thereby provided at high fluid pressure differentials for preventing fluid leakage from the upstream passage 15 into cavity 19.

When the line fluid pressure acting on seat ring 92 decreases, insert 38, being made of elastomeric material, is sufficiently resilient to axially urge seat ring 92 towards its position where end face 122 seats against shoulder 120.

The action of downstream fluid pressure on the assembly of seat ring 130 and insert 39 is the same as that just described for the assembly of seat ring 92 and insert 38.

Any fluid pressure differential acting across cavity 19 does not cause plug 36 to float towards the downstream end of cavity 19 because of the engagement of trunnions 56 and 57 in bearings 58 and 59. Accordingly, only the lip 115 of insert 39 on the downstream side of cavity 19 engages the plug seating surface when plug 36 is in its closed position and as long as there is little or no fluid pressure in passage 16. Under these conditions, the development of any excessive fluid pressure in cavity 19 will be effective to sufficiently flex lip 115 on insert 39 to allow the cavity fluid to be vented into passage 16 even though a relative high pressure is present in passage 15. If the pressure differential is reversed such that the higher line fluid pressure is in passage 16 instead of passage 15, it is clear that the venting function of the seat ring inserts is reversed.

By undercutting each shoulder 120 an internal recess is defined in each of the passages 15 and 16 by the seat ring end face 122 and surface 127. Each of these recesses causes considerable turbulence behind each seat ring during flow of line fluid through the valve body. This turbulence scours out any debris or particles which may have become lodged in these regions when the valve was closed. Thus, the recessed seating regions for seat rings 92 and 130 are effectively cleaned by opening the valve to prevent accumulation of matter that might interfere with the floating action of the seat rings.

According to this invention, it was unexpectedly found that for the construction of the valve described herein, the use of urethane in making inserts 38 and 39 provided significant advantages over other elastically deformable materials. As compared with other seat ring materials, a relatively hard urethane insert having a durometer hardness of 70 on the D scale is tougher, stronger, and more easy to permanently bond to metal. In addition, urethane, while being tougher and harder, is as elastically deformable as softer rubbers and, as compared with different materials of the same hardness, is more capable of resuming its original shape without permanent deformation.

In this invention, the urethane inserts 38 and 39 normally prevent metal-to-metal contact between the metallic plug 36 and the metallic seat rings 92 and 130, but if the inserts are accidentally overloaded to allow this contact, the urethane readily recovers its original shape when the load is released. In comparison, plastic materials, such as Teflon and the like, would not recover, but would become permanently deformed to impair the effectiveness of the valve.

As compared with softer grades of urethane, the relatively hard inserts 38 and 39 of this invention more effectively maintain their shape, deflect less, are easier to retain in place, are more durable in service, and are less subject to flutter under dynamic loading conditions. The reduced deflection attributable to the urethane inserts of this invention is particularly important because it guarantees an effective separation of the seat from the valve plug. By employing the urethane inserts, any coating applied to the valve plug is not likely to be damaged.

Urethane as compared with different elastically deformable materials also was found to be more compatible with hydrocarbons and is less likely to tear out of the metallic seat rings under shear stress. The ability of urethane to bond to metal is an exceptional advantage in this invention since it provides an easy means for retaining the insert in its seat ring recess. The urethane inserts of this invention are also exceptionally resistant to wear and abrasion to thus provide for a longer lasting seat. The relatively hard urethane used herein advantageously allows higher unit loads to be applied to the seat ring inserts. The inherent resiliency of the urethane inserts eliminate the need for separate springs or the like to urge seat rings 92 and 130 into seating engagement with shoulders 120.

As shown, inserts 38 and 39 are each surrounded on three sides by the recess walls of their respective metallic seat rings. Each insert is bonded to all of the seat ring recess walls which are smooth and without grooves or the like.

The parts of the valve described herein are assembled in a unique manner to preload inserts 38 and 39 for providing an initial seal when there is little or no line fluid pressure. First, the seat rings 90 and 132 together with their respective inserts 38 and 39 are slidably inserted into the separately formed members 12 and 13 through the enlarged cavity-forming ends of the body members. Then, one of the body members 12 or 13 is placed on end with its cavity-forming end facing upwardly and plug 36 with its stem and trunnion parts is placed in the body member and seated on the seat ring insert therein. The weight of plug 36 partially preloads the seat ring insert (38 or 39) on which it is seated. Bosses 22 and 23 with their bearings 58 and 59 are placed on trunnions 56 and 57 by sliding them onto their respective parts preferably after plug 36 is placed in the upwardly turned body member. Bosses 22 and 23 are then clamped in place with respect to the body member (12 or 13) in which plug 36 was placed. The other body member (12 or 13) together with its assembled seat ring and insert is then assembled on the sub-assembly of the first body member, plug 36, and bosses 22 and 23. Body members 12 and 13 are then mechanically clamped to each other by suitable clamping fixtures and pulled together to proper mating positions where both inserts 38 and 39 are partially and uniformly preloaded. This mechanism preloading step pre-squeezes inserts 38 and 39 from 50 to 100 thousandths of an inch.

After inserts 38 and 39 are partially preloaded in this manner, members 12 and 13, which are still mechanically clamped together, are then fixed relative to each other by tack welding in grooves 30. Bosses 22 and 23 are also tack welded to members 12 and 13 to thus secure members 12 and 13 and bosses 22 and 23 against relative movement. After tack welding, one continuous, very light welding bead is placed around the body in grooves 30 and around bosses 22 and 23. The valve body parts are now held securely together with inserts 38 and 39 partially preloaded.

For the finished welding step, a liquid coolant is introduced into and circulated through the valve body by providing top and bottom openings indicated at 140 in FIGURES 2 and 3. These openings are later closed by threaded plugs 141 before the valve is placed in operation. The final welding beads are then applied to form welds 24, 25, 32 and 33. As these welds cool, they shrink to draw body members 12 and 13 slightly towards each other to complete the preloading of inserts 38 and 39 by squeezing them from 40 to 50 thousandths of an inch.

In all, therefore, inserts 38 and 39 are preloaded by being squeezed from 90 to 150 thousandths of an inch. This preloaded condition of inserts 38 and 39 is maintained throughout the operation of the valve for providing the initial fluid tight seal when there is little or no line fluid pressure as previously mentioned.

Before body members 12 and 13 are mechanically pulled together by clamping fixtures to partially preload inserts 38 and 39, the end of lip 27 is axially spaced from the bottom end of recess 26, which is defined by the radial shoulder 144 (see FIGURE 5), to allow members 12 and 13 to be drawn together sufficiently to squeeze inserts 38 and 39 by the previously mentioned amounts. The end of lip 27 is adapted to abut shoulder 144 to limit the extent to which inserts 38 and 39 are squeezed during the two preloading steps mentioned above. If lip 27 is found to be too long, it is shortened by grinding its end face.

As shown in FIGURES 2–4, sufficient clearance is provided between bosses 22 and 23 and the edges of apertures 20 and 21 respectively to allow body members 12 and 13 to be drawn together for preloading inserts 38 and 39.

What is claimed and desired to be secured by Letters Patent is:

1. In a plug valve assembly, a body having separately formed upstream and downstream fluid passage sections rigidly joined together by a welded joint, a ported, ball type plug rotatable in said body between positions where it respectively blocks and provides fluid communication between the fluid flow passages in said sections, an elastically deformable seat ring mounted in at least one of said sections and adapted to be axially displaced by fluid pressure to deform against said plug for providing a fluid tight seal around the inner end of the flow passage through said one section when said plug is rotated to its fluid blocking position, said sections being sufficiently drawn together by shrinkage of said weld joint to deform said seat ring against said plug and thereby provide a preloaded seating pressure between said plug and said seat ring during valve operation, and means mounting said seat ring in said one section for axial displacement with respect to the fluid flow passage in said one section, said seat ring mounting means comprising a rigid support ring having an axially opening recess into which said seat ring is inserted, said seat ring being secured to said support ring, with the latter being slidably seated in an enlarged, recessed portion formed in said one section near the inner end thereof, said recessed portion having a radially extending shoulder axially facing an end face on said support ring for limiting axial displacement of said support ring away from said plug, said seat ring, by engagement with said plug, being effective to yieldably bias said support ring towards said shoulder.

2. The plug valve assembly defined in claim 1 wherein said seat ring is made from an elastomeric material.

3. The plug valve assembly defined in claim 1 wherein said support ring is biased by said seat ring to a position wherein said end face seats against said shoulder when there is little or no fluid pressure in the flow passage of said one section.

4. In a plug valve assembly having a body formed with upstream and downstream fluid passages opening at their inner ends into a valve plug cavity, a ported, ball type plug rotatable within said cavity between positions where it blocks and provides fluid communication between said passages, a rigid seat ring coaxially mounted in said body at the inner end of at least one of said passages for limited axial displacement toward and away from said plug, said seat ring having an annular recess opening axially towards said plug and receiving an annular elastically deformable seat ring insert, said insert being secured in said recess for displacement with said seat ring and having an annular essentially spherical surface adapted, upon displacement of said seat ring, to engage a corresponding spherically contoured surface on said plug for providing a fluid tight seal around the inner end of said one passage when said plug is in its fluid blocking position, an annular lip formed on said insert at the inner periphery of the spherical surface thereon, said lip being deformed against said plug when little or no fluid pressure is in said one passage to space the insert spherical surface from said plug and to provide an initial seal around the inner end said one passage, said seat ring being exposed for axial displacement by a predetermined fluid pressure in said one passage to further deform said lip and to urge said insert spherical surface against said plug surface for establishing said fluid tight seal when said plug is in its blocking position, said seat ring being slidable in a recessed portion formed in said body and having a radial shoulder facing the rearward end face of said seat ring for limiting displacement of said seat ring away from said cavity, said body having an internal fluid passage forming section gradually diverging towards said cavity and terminating at its inner end at the inner peripheral edge of said shoulder, the inner diameter of said seat ring being smaller than the diameter of said shoulder at its inner periphery to thereby form a pocket for creating turbulence in the fluid flowing through said one passage, the turbulence of fluid in said pocket being effective to clean out matter lodged behind the rearward end face of said seat ring.

5. The plug valve assembly defined in claim 4 wherein said insert is effective to yieldably bias said seat ring into engagemnt with said shoulder when little or no fluid pressure is in said one passage.

6. In a plug valve assembly having a body formed with upstream and downstream fluid flow passages opening at their inner ends into a valve plug cavity, and seat means disposed within said body at the inner ends of said passages, a ported, ball type plug rotatably mounted in said cavity between positions where it respectively blocks and provides fluid communication between said passages, said plug being formed with a cylindrical body section having a through bore defining the plug port and a plurality of annular ribs formed integral with said cylindrical section and extending outwardly therefrom to define a series of four cavities spaced equiangularly around the periphery of said body section and opening radially outwardly with respect to said cylindrical section, the end faces of said ribs being contained in a common, essentially spherical envelope and being engaged with said seat means as said plug is rotated between its fluid blocking and communicating positions.

7. The plug valve assembly defined in claim 6 wherein each of said ribs tangentially merges at diametrically opposed regions with the ribs adjacent thereto.

8. In a plug valve assembly having a body formed with upstream and downstream fluid flow passages opening at their inner ends into a valve plug cavity, a ported, ball-type plug rotatable within said cavity between positions where it respectively blocks and provides fluid communication between said passages, a urethane seat ring mounted in said body at least at the inner end of one of said passages and engaging said plug to provide an annular fluid tight seal around the inner end of said one passage when said plug is in its fluid-blocking position, said urethane seat ring having a durometer hardness of about 70 on the D scale.

9. The plug valve assembly defined in claim 8 comprising a support ring seat mounted in said body coaxially with said one passage and having an annular recess opening axially towards said cavity and receiving said seat ring, said seat ring being secured to said support ring only by adhesive applied at the interface between the internal walls of said recess and the opposing surfaces of said seat ring.

10. The plug valve assembly defined in claim 9 wherein said recess is formed with cylindrically rough, concentric circumferential wall surfaces and a flat bottom end wall surface extending at right angles to the longitudinal support ring axis, said seat ring completely filling said recess and having mating surfaces seated against said circumferential and end wall surfaces.

11. The plug valve assembly defined in claim 10 wherein said support ring is formed with radial end faces respectively extending from the inner and outer peripheral edges of said recess and axially facing said cavity, said end faces being contained in parallel planes, with the plane containing the end face extending from the outer peripheral, recess edge being spaced axially between said cavity and the plane containing the other of said end faces, said seat ring extending through the mouth of said recess and axially beyond said other end face.

12. In a plug valve assembly having a body formed with upstream and downstream fluid passages opening at their inner ends into a valve plug cavity, a ported, ball-type plug rotatable within said cavity between positions where it respectively blocks and provides fluid communication between said passages, and seat means positioned in said body and engaging said plug to provide fluid tight seals around the inner ends of said passages when said plug is rotated to its fluid blocking position, at least one trunnion formed rigid with said plug in coaxial relation with the plug rotational axis, a boss member fixed to said body and having a through bore coaxially receiving said trunnion, an annular land formed integral with said boss member and extending radially inwardly into the trunnion receiving bore to define axially oppositely facing shoulders intermediate the opposite ends of said trunnion receiving bore, a sleeve bearing journalling said trunnion and being seated in said bore axially between said plug and the one of said shoulders axially facing said plug, a spacer ring axially, displaceably mounted in said bore and rotatably receiving the other end of said trunnion in axially outwardly spaced relation from the other of said shoulders, a resilient O-ring peripherally surrounding said trunnion and being engagingly confined axially between the axially opposed faces on said other shoulder and said spacer ring to engage and provide a fluid tight seal around the trunnion periphery, and a retainer plate detachably secured to the outer end of said boss member and bearing against said spacer ring to retain it in seating engagement with said O-ring.

13. In a plug valve assembly having a body formed with upstream and downstream fluid flow passages opening at their inner ends into a valve plug cavity, a ported, ball-type plug rotatable within said cavity between positions where it respectively blocks and provides fluid communication between said passages, and seat means positioned in said body and engaging said plug for providing fluid tight seals around the inner ends of said passages when said plug is in its fluid blocking position, a pair of axially aligned trunnions formed rigid with said plug at diametrically opposite regions thereon, a valve plug operating stem section formed rigid with one of said trunnions, and a pair of axially aligned trunnion bearing and sealing assemblies respectively associated with said trunnions and each comprising a boss member fixed to said body and having a through bore coaxially receiving its associated trunnion, an annular land formed integral with said boss member and extending radially into said bore to define axially oppositely facing shoulders intermediate the opposite ends of said bore, a sleeve bearing seated in said bore axially between said plug and the one of said shoulders facing said plug for journalling the associated trunnion, a spacer ring axially, displaceably mounted in said bore and rotatably receiving the associated trunnion in axially outwardly spaced relation from the other of said shoulders, a resilient O-ring peripherally surrounding the associated trunnion and being engagingly confined between the axially opposed faces on said other shoulder and said spacer ring to engage and provide a fluid tight seal around the trunnion periphery, and a retainer plate detachably secured to the outer end of said boss member and bearing against said spacer ring to retain it in seating engagement with said O-ring, the retainer plate in the assembly associated with said one trunnion having an aperture through which said stem section extends, the retainer plate in the assembly associated with the other of said trunnions having a vent hole and extending over the outer end of the trunnion receiving bore to define with the trunnion end a confined space in the outer end of the trunnion receiving bore axially outwardly of the O-ring therein, said confined space being vented through said hole to balance the atmospheric pressures acting on opposite ends of said stem section and said other trunnion.

14. The plug valve assembly defined in claim 13 wherein the boss members of said assemblies extend through said body and into said cavity and have axially opposed faces adapted to seat against opposing faces on said plug for confining said plug against axial displacement along its rotational axis.

15. In a plug valve assembly, a body formed with upstream and downstream passages opening at their inner ends into a valve plug cavity, a ported, ball-type valve plug, means journalling said plug within said cavity for rotation between positions where it respectively blocks and provides fluid communication between said passages, said journalling means preventing said plug from being bodily displaced by fluid pressure toward or away from the inner end of either of said passages, said body having a pair of separately formed, axially aligned sections respectively defining said upstream and downstream passages, each of said sections being formed with an inner end portion defining a part of said cavity, a weld joint encircling said body and joining said sections together at their inner end portions, and an axially floating seat ring assembly mounted for free axial sliding movement between a spherical seating surface on said plug and an opposing internal surface of one of said sections at the inner end of at least one of said passages, said seat ring assembly comprising a relatively rigid seat ring and a sealing annulus made of elastically deformable material and being anchored to said seat ring, said seat ring assembly being displaceable by fluid pressure in said body to deform said annulus against said spherical surface for providing a fluid tight seal between said seat ring and said plug, the difference in the axial dimension of said weld joint in shrunken and unshrunken conditions being sufficient to provide said one of said sections with an axial dimension between said opposing surface and said spherical surface that is small enough to seat said opposing surface against an annular surface of said assembly and to axially urge said assembly to a position where said annulus deforms against said spherical surface and thereby provides a preloaded seating pressure between said plug and said annulus during valve operation.

16. The plug valve assembly defined in claim 15 wherein said seat ring is formed with an annular recess opening axially toward said cavity and wherein said annulus is anchored in said annular recess and projects therefrom for engagement with said plug.

17. The plug valve assembly defined in claim 16 wherein circumferentially extending portions of said joint are medially intersected by a plane containing the rotational axis of said plug and extending transversely of the longitudinal axes of said passages.

References Cited

UNITED STATES PATENTS

| | | | |
|---|---|---|---|
| 2,573,177 | 10/1951 | Bohlen | 29—157.1 |
| 3,037,738 | 6/1962 | Jackson et al. | 251—172 |
| 3,184,213 | 5/1965 | Anderson | 251—172 |
| 3,195,857 | 7/1965 | Shafer | 251—315 XR |
| 3,208,718 | 9/1965 | White | 251—172 |
| 3,241,808 | 3/1966 | Allen | 251—172 XR |
| 3,286,981 | 11/1966 | Brice | 251—315 |
| 3,315,697 | 4/1967 | Oliver | 251—315 XR |
| 3,323,542 | 6/1967 | Magos et al. | 251—172 XR |
| 3,356,333 | 12/1967 | Scaramucci | 251—172 |
| 3,380,709 | 4/1968 | Scaramucci | 251—172 |

STANLEY N. GILREATH, Primary Examiner

WERNER H. SCHROEDER, Assistant Examiner

U.S. Cl. X.R.

29—157; 251—315